United States Patent [19]

Czumak et al.

[11] Patent Number: 4,630,914
[45] Date of Patent: Dec. 23, 1986

[54] PHOTOGRAPHIC FILM FRAME EJECTOR

[75] Inventors: Frank M. Czumak, Salem, N.H.; Donald J. Sulesky, Arlington, Mass.

[73] Assignee: Polaroid Corporation, Cambridge, Mass.

[21] Appl. No.: 809,031

[22] Filed: Dec. 16, 1985

[51] Int. Cl.⁴ ............................................. G03B 17/26
[52] U.S. Cl. ..................................... 354/212; 354/276
[58] Field of Search ............... 354/180, 182, 212, 276, 354/277

[56] References Cited

U.S. PATENT DOCUMENTS

| | | | |
|---|---|---|---|
| 2,602,386 | 7/1952 | Brigham et al. | 354/182 |
| 3,460,452 | 8/1969 | Land | 354/86 |
| 3,525,293 | 8/1970 | Harvey | 354/182 |
| 3,678,830 | 7/1972 | erlichman | 354/182 |
| 4,114,166 | 9/1978 | Driscoll et al. | 354/276 |
| 4,229,090 | 10/1980 | Driscol et al. | 354/86 |
| 4,566,770 | 1/1986 | Czumak et al. | 354/276 |

Primary Examiner—A. A. Mathews
Attorney, Agent, or Firm—Alfred E. Corrigan

[57] ABSTRACT

Apparatus including a unitary resilient member for ejecting or moving a film frame from a container which houses a plurality of the same. The unitary resilient member is adapted to receive a force from a suitable drive for flexing the unitary resilient member from a first configuration, wherein it is in a relatively unstressed condition, to a second configuration, wherein it is in a stressed condition. During such flexure it moves a film frame at least partially from the container.

9 Claims, 3 Drawing Figures

PHOTOGRAPHIC FILM FRAME EJECTOR

BACKGROUND OF THE INVENTION

1. Field of the Invention

The invention relates to apparatus for advancing a unitary photographic film frame at least part way out of a container.

2. Description of the Prior Art

The present invention relates to an apparatus for advancing a photographic film frame toward the exterior of a container, and more particularly to such an apparatus which contains a resilient member that is adapted to be flexed to accomplish such movement of the film frame. The prior art is replete with apparatus for sequentially moving individual film frames from a stack and advancing them toward the exterior of a container or film cassette. Examples of such apparatus may be found in U.S. Pat. Nos. 4,229,090 and 3,460,452. However, such apparatus are generally complicated and are comprised of several parts whose dimensions must be kept within close tolerances. Thus, such apparatus are relatively expensive, take time to assemble, and occupy valuable space within the structure in which they are to be incorporated. Accordingly, it can readily be seen that there is a need for a film frame advancing structure which contains a minimum of parts, is relatively easy to assemble, and occupies a minimum of space.

SUMMARY OF THE INVENTION

The present invention relates to an apparatus for moving a film frame toward the exterior of a container, and more particularly to such an apparatus which is comprised of a minimum number of parts, e.g., a drive member and a driven member. The latter member, also referred to herein as an ejector, consists of an elongate strip of resilient material, e.g., a polypropylene plastic, having a thickness of approximately 0.060 mils (slightly less than the thickness of a film frame), while the drive member may be a cam, a solenoid or any other suitable electro and/or mechanical member for imparting linear motion to the aforementioned end of the elongate strip of resilient material. Alternatively, the apparatus may consist of a single member, i.e., the aforementioned ejector having a manually actuatable handle formed on one end thereof.

The elongate strip or ejector is adapted to be inserted into an ingress in one side wall of a container and be received within a laterally extending recess or channel located in an interior surface of an end wall of the container. The recess or channel has an end which is configured to prevent the end of the ejector from popping out of the recess when flexed, while the remainder of the recess is configured to allow the ejector to be flexed in a single plane when an input is applied to the opposite end of the ejector, such plane containing one of the film frames.

The ejector is constructed to assume a generally linear elongate configuration when in an unstressed condition. When a film frame is to be advanced toward the exterior of the container, one actuates the drive member so as to provide a linear input into the aforementioned opposite end of the ejector, which input is generally in line with the ejector. This input causes the ejector to flex into a configuration wherein it assumes a generally inverted U-shape. During such flexure to an intermediate portion of the ejector engages a trailing edge of a film frame and advances the latter at least part way out of the container. When the input is removed from the said opposite end of the ejector it automatically assumes its original configuration.

An object of the invention is to provide an apparatus having a resilient member which is adapted to be flexed between two configurations so as to move a film frame at least partially from a container.

Another object of the invention is to provide an apparatus of the type described in which the resilient member is adapted to receive an input force in a first direction and change it to an output force in a second direction generally normal to the first direction.

The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
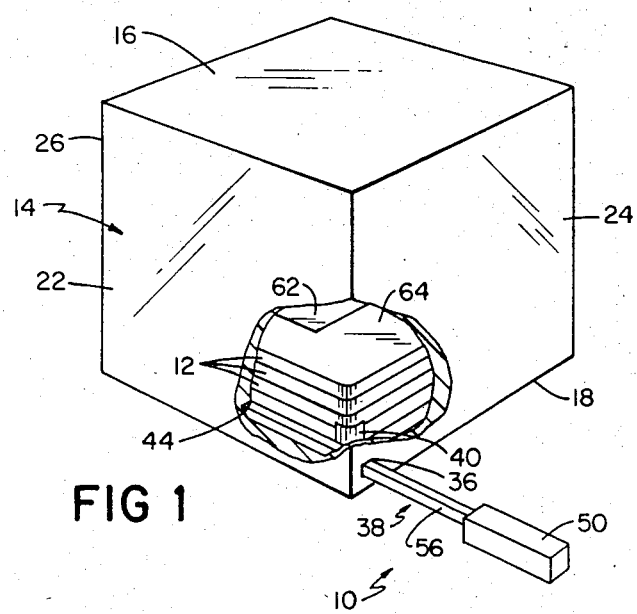
FIG. 1 is a perspective view of a container which houses a stack of individual film frames, and of the apparatus of the present invention which is especially adapted for use therewith.
Figure 2:
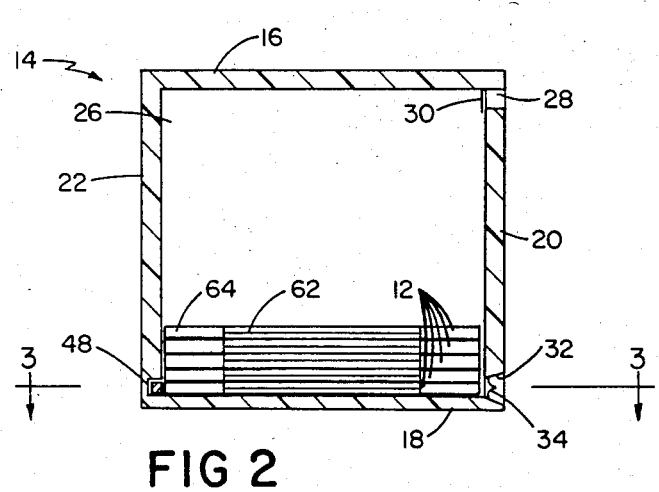
FIG. 2 is a side elevational view, partially in section, generally taken along the line 2—2 of FIG. 3.

Reference is now made to the drawings wherein is shown an apparatus 10 for sequentially moving a plurality of individual film frames 12 from a lighttight container 14. The container 14 includes top and bottom walls 16 and 18, respectively, which are interconnected by leading and trailing end walls 20 and 22, respectively, and a pair of side walls 24 and 26. The leading end wall 20 is provided with a laterally extending slot 28 through which the film frames 12 are adapted to be advanced into the interior of the container 14 subsequent to their exposure in photographic apparatus (not shown). Suitable light shielding means such as a resilient flap 30 is provided for preventing entry of light into the container via the slot 28. The lower end of the leading end wall 20 is provided with an egress 32 which extends laterally between the side walls 24 and 26 and is configured to allow the passage of the film frames 12 from the interior of the container 14. The egress 32 is light sealed by a pair of resilient flaps 34.

Figure 3:
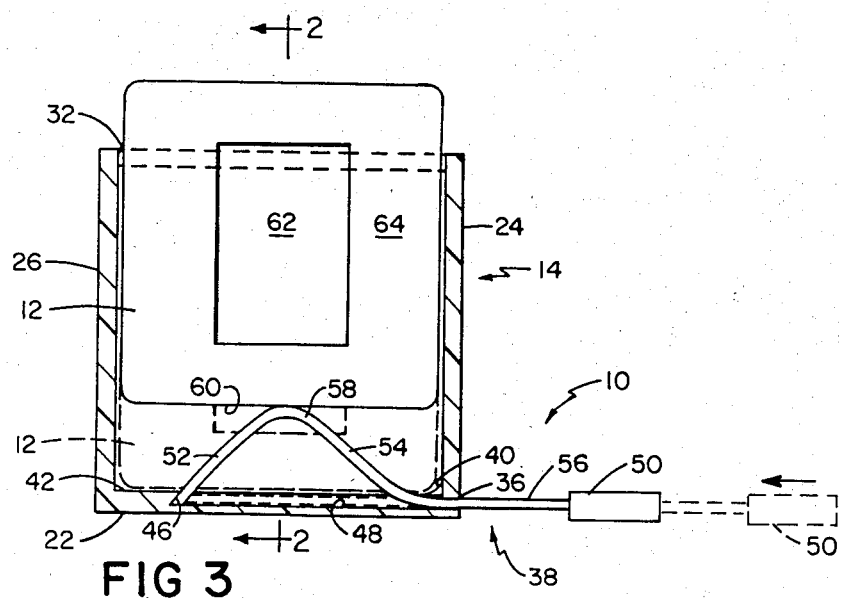
FIG. 3 is a top elevational view of the structure shown in FIGS. 1 and 2, generally taken along the line 3—3 of FIG. 2 and being rotated ninety degrees in a counterclockwise direction.

The side wall 24 of the container 14 includes an ingress 36 which is constructed to allow the entry of an elongate member or film frame ejector 38 into the container 14, such ingress being rendered lighttight by a resilient flap 40 having one end suitably attached to an interior surface of the side wall 24. An interior surface 42 of the trailing end wall 22 is formed with a laterally extending slot 44 which extends from the side wall 24 toward the side wall 26 and is terminated short of the side wall 26 by an inclined surface 46 which defines an enclosed angle of approximately forty-five (45) degrees with a wall 48 of the slot 44. As shown in FIG. 3, the inclined surface 46 serves as a stop to limit movement of the ejector 38 toward the side wall 26, to prevent the left hand end of the ejector 38 from popping out of the slot 44, and to provide the correct degree of flexure in the ejector 38 when a force is applied thereto by its drive 50. The slot 44 serves as a restraining structure for the ejector 38 insofar as it limits flexure movement of the ejector 38 to a single plane, which plane, as shown in FIG. 3, also contains the bottom film frame 12 in the stack.

The ejector 38 is formed from a resilient material such as polypropylene plastic and consists of first, second, and third portions 52, 54 and 56, respectively. The ejector 38 is adapted to receive an input force from the drive 50 so as to move or flex the ejector 38 from a first configuration (broken line in FIG. 3) wherein the ejector 38 is located at least in part within the slot 44 and is in a relatively unstressed condition with a film frame engaging portion 58 located adjacent a trailing edge 60 of the lowermost film frame 12, and a second configuration (solid line in FIG. 3) wherein the ejector 38 is in a stressed condition and the first and second portions 52 and 54 thereof define an included angle of approximately ninety (90) degrees. During such flexure, the film frame engaging portion 58 moves in a first direction, generally normal to the direction of aforementioned input force, to move the film frame 12 at least partially through the container's egress 32.

The container 14 is adapted to be attached to a camera of the type described in the copending application Ser. No. 675,651, filed on Nov. 28, 1984 by Frank M. Czumak et al. entitled "Mount For Transparency Film Frame", now U.S. Pat. No. 4,566,770, assigned in common herewith. The container 14 is attached to the camera by any suitable means such that the laterally extending slot 28 is located in alignment with the path of movement of a film frame 12 as the latter is being moved out of its exposure position and into the light-tight container 14. After one or more of the film frames 12 have been photographically exposed and advanced into the container 14, the latter may be detached from the camera and inserted into a processor of the general type shown in said copending application. The processor would include the film frame ejector 38 as well as its drive 50, and the free end of the ejector 38 would be located in alignment with the ingress 36 in the container 14 such that the ejector 38 would be partially received within the slot 44 when the container is fully inserted into the processor. The lowermost film frame 12 in the stack of film frames 12 located within the container 14 may now be moved toward the exterior of the container 14 via the egress 32 by actuating the drive 50, as previously described. Such actuation moves the ejector 38 to the left from the broken line position to the solid line position (as shown in FIG. 3) thus advancing the film frame 12 from its broken line position to its solid line position (also shown in FIG. 3). Alternatively, if the drive 50 were to be manually actuated, it, the drive 50, would originally be located in the broken line position and would be moved to the left into the solid line position thereby causing the flexure of the ejector 38. As the film frame 12 moves out of the container 14, its leading end enters the bite of a pair of laminating rollers (not shown). As is more fully described in the aforementioned Czumak et al. application for patent, the laminating rollers continue the advancement of the film frame 12 from the container 14 while simultaneously laminating a sheet of material containing a layer of processing liquid to the emulsion side of a chip 62 of instant type transparency film which is sandwiched between two planar sections of a frame 64. After a period of time sufficient to initiate the formation of a visible image in the chip 62, e.g. one minute, the sheet is stripped from the film chip 62 and the latter is ready for placement in a viewer or projector. As is well known in the art, the film chip 62 includes, as one of its layers, a stripping layer which facilitates removal of the emulsion layer as well as a rear opaque layer during removal of the sheet material thus increasing visual acuity and brightness of the resultant transparency and enhancing its stability by virtue of the removal of residual processing reagent in the emulsion or photosensitive layer.

Since certain changes may be made in the above-described invention without departing from the scope thereof, it is intended that all matter contained in the above description or shown in the accompanying drawings shall be interpreted as illustrative and not in a limiting sense.

What is claimed is:

1. Apparatus for sequentially moving a plurality of individual film frames from a container of the type having an ingress, an egress, and a restraining structure for restricting movement of a film frame ejector to a single plane, said apparatus comprising:

a film frame ejector having a film frame engaging portion which is adapted to extend into the container via the ingress, said film frame ejector being adapted to be moved from a first configuration wherein said film frame ejector is located at least in part within the restraining structure of the container and is in a relatively unstressed condition with said film frame engaging portion located adjacent an edge of a film frame, and a second configuration wherein said film frame ejector is in a stressed condition, said film frame engaging portion being moved in a first direction so as to move a film frame at least partially through the container's egress as said film frame ejector is moved from said first configuration to said second configuration; and means for applying a force in a second direction substantially normal to said first direction for moving said film frame ejector from said first configuration to said second configuration.

2. An apparatus as defined in claim 1 wherein said film frame ejector is formed from a resilient material whereby said film frame ejector automatically returns to said first configuration upon the removal of said force by said force applying means.

3. An apparatus as defined in claim 2 wherein said film frame ejector includes first, second and third portions, said first portion including a first end which is adapted to cooperate with the restraining structure of the container to prevent movement of said first portion in said second direction when said force is being applied to said third portion.

4. An apparatus as defined in claim 3 wherein said first and second portions define an increasingly smaller angle with each other as said film frame ejector moves toward said second configuration.

5. An apparatus as defined in claim 1 wherein said first and second portions define an included angle with each of approximately ninety degrees when said film frame ejector is in said second configuration.

6. An apparatus as defined in claim 5 wherein said included angle includes an apex which is located in approximate alignment with a center line of a film frame when said film frame ejector is in said second configuration.

7. An apparatus as defined in claim 2 wherein said film frame ejector is a unitary member.

8. An apparatus as defined in claim 7 wherein said unitary member is formed from a polypropylene plastic.

9. An apparatus as defined in claim 7 wherein said film frame engaging portion has a thickness less than the thickness of one of the film frames.

* * * * *